(12) United States Patent
Schott et al.

(10) Patent No.: US 10,676,141 B2
(45) Date of Patent: Jun. 9, 2020

(54) METHOD OF PROVIDING A BALLASTING PROPOSAL

(71) Applicant: DEERE & COMPANY, Moline, IL (US)

(72) Inventors: Florian Schott, Bensheim (DE); Florian Reinmuth, Mannheim (DE)

(73) Assignee: Deere & Company, Moline, IL (US)

(*) Notice: Subject to any disclaimer, the term of this patent is extended or adjusted under 35 U.S.C. 154(b) by 67 days.

(21) Appl. No.: 15/943,803

(22) Filed: Apr. 3, 2018

(65) Prior Publication Data

US 2018/0290696 A1 Oct. 11, 2018

(51) Int. Cl.

| | | |
|---|---|---|
| *B62D 49/06* | (2006.01) | |
| *A01B 76/00* | (2006.01) | |
| *B60C 23/00* | (2006.01) | |
| *A01B 3/14* | (2006.01) | |
| *B62D 49/08* | (2006.01) | |
| *A01B 63/14* | (2006.01) | |
| *B60B 15/28* | (2006.01) | |
| *A01B 63/114* | (2006.01) | |

(52) U.S. Cl.
CPC ........ *B62D 49/0628* (2013.01); *A01B 63/145* (2013.01); *A01B 76/00* (2013.01); *B60B 15/28* (2013.01); *B60C 23/002* (2013.01); *B62D 49/085* (2013.01); *A01B 63/1145* (2013.01); *B60K 2370/11* (2019.05); *B60K 2370/1438* (2019.05)

(58) Field of Classification Search
USPC ........................................................ 701/50
See application file for complete search history.

(56) References Cited

U.S. PATENT DOCUMENTS

| | | | | |
|---|---|---|---|---|
| 2014/0343802 | A1* | 11/2014 | Pichlmaier | ............ A01B 63/112 701/50 |
| 2015/0057897 | A1* | 2/2015 | Stoiber | ................ A01B 63/112 701/50 |

(Continued)

FOREIGN PATENT DOCUMENTS

| | | |
|---|---|---|
| DE | 202010016438 U1 | 2/2011 |
| DE | 10 2016 207 205 A1 | 11/2017 |

(Continued)

OTHER PUBLICATIONS

Fendt Grip Assistant. [online]. AGCO GmbH, 2017, [retrieved on Feb. 27, 2017]. Retrieved from the internet: http://www.fendt.com/de/15083.asp.

(Continued)

*Primary Examiner* — Tyler D Paige

(57) ABSTRACT

A method for making available a ballasting proposal for an agricultural tractor includes providing an implement for the tractor, calculating a target tractive power for the implement for each axle of the agricultural tractor, and deriving a target value for an axle load to be maintained on each axle based upon a function of the calculated target tractive power. The method further includes determining an actual axle load on each axle, comparing the target value to the actual axle load, calculating an axle ballasting value based on a result of the comparing step required to maintain the target valve, and outputting the ballasting value.

18 Claims, 2 Drawing Sheets

(56) References Cited

U.S. PATENT DOCUMENTS

| | | | | |
|---|---|---|---|---|
| 2016/0016470 | A1* | 1/2016 | Pichlmaier | B60K 35/00 701/34.2 |
| 2016/0023695 | A1* | 1/2016 | Obermeier-Hartmann | B62D 55/112 180/9.54 |
| 2016/0046168 | A1* | 2/2016 | Foxen | B60G 17/0152 280/5.515 |
| 2017/0300219 | A1* | 10/2017 | Buchner | B62D 49/0628 |
| 2018/0274968 | A1* | 9/2018 | Brenninger | B62D 49/00 |

FOREIGN PATENT DOCUMENTS

| | | | |
|---|---|---|---|
| DE | 102016207205 | A1 | 11/2017 |
| EP | 2583543 | A1 | 4/2013 |
| EP | 2 734 026 | B1 | 1/2015 |
| WO | 2016/045869 | A1 | 3/2016 |
| WO | 2016045868 | A1 | 3/2016 |
| WO | 2016045869 | A1 | 3/2016 |

OTHER PUBLICATIONS

Pranav PK et al and Pandey KP et al, Computer simulation of ballast management for agricultural tractors, Journal of Terramechanics, dated Dec. 1, 2008, pp. 185-192, issue number 45Elsevier, Amsterdam, NL.

German Search Report issued in counterpart application No. 102017205827.7 dated Jun. 12, 2018. (10 pages).

European Search Report issued in counterpart application No. 18165627.3 dated Jul. 2, 2018. (9 pages).

\* cited by examiner

METHOD OF PROVIDING A BALLASTING PROPOSAL

RELATED APPLICATIONS

This application claims priority to German Patent Application Ser. No. 102017205827.7, filed Apr. 5, 2017, the disclosure of which is hereby expressly incorporated by reference in its entirety.

FIELD OF THE DISCLOSURE

The present disclosure relates to a method for making available a ballasting proposal for an agricultural tractor.

BACKGROUND

Correct ballasting of an agricultural tractor with an implement attached to it is possible only with the appropriate experience. Thus, the user needs not only information about the weight and center of gravity of the implement, but he must also be capable of estimating its effect on the axle loads or axle load distribution of the agricultural tractor. This involves hard-to-estimate effects on the part of the soil that is to be worked, which lead to a dynamic shifting of the axle loads in each case according to soil properties when using soil-working implements, including the soil working speed at which the implement is pulled over or through the soil.

Thus, there is a need to develop a method that supports a user of an agricultural tractor in making an evaluation of the correct ballasting.

SUMMARY

In one embodiment of this disclosure, a method for making available a ballasting proposal for an agricultural tractor includes a target tractive power that is specific for a selected implement is first calculated for each of the axles of the agricultural tractor. Then a target value for an axle load that is to be maintained at the relevant axle is derived in dependence on the calculated target tractive power and is compared with an actual value determined for the axle load, and on the basis of the comparison result, a ballasting required to maintain the target value for each axle is calculated and is output in the form of an associated ballasting proposal.

The specific target tractive power represents the drive power that is to be transmitted by the agricultural tractor to the soil, and which, in accordance with the selected implement, is to be applied to the relevant axle for optimum conduction of an associated soil working function. In turn, based on the tractive capacity of the associated tires, which is assumed to be known, a contact force required for transfer of the corresponding drive power can be derived for each of the axles of the agricultural tractor from the specific target tractive power, and the target value to be maintained in this respect for the axle load at the relevant axle can be derived directly from the contact force.

The ballasting proposal obtained by comparison with the actual value of the axle load can easily be implemented by the user by adding or removing the corresponding additional weights (for example, wheel weights, front or rear weights), where already mounted additional weights can be taken into account within the scope of the ballasting proposal since they can be incorporated into the actual value determined for the axle load.

With regard to the tractive capacity of the tires, which is already considered to be known, a fixed characteristic value for the relevant tire model can be specified, but there is also the possibility of deriving the actual tractive capacity in dependence on a current tire pressure and the tire model that is used and correspondingly to make it the basis of the calculation of the target value of the axle load. Here the tire pressure or the tire model can be provided in the form of the corresponding filling pressure or identifying data by an RFID sensor embedded in a tire where it is transmitted wirelessly by means of an RFID reader to a microprocessor-controlled control unit, which implements the method on the basis of appropriate software. Alternatively, the wireless transmission of the filling pressure or identifying data provided by a tire sensor takes place according to the Bluetooth standard, for which the control unit has a corresponding Bluetooth interface. Besides being provided by a sensor, the possibility of manual entry of the tire pressure or the tire model via a graphical user interface connected to the control unit is also conceivable. The graphical user interface can comprise a touch-sensitive user and display panel and is, for example, mounted on the A column inside a driver cab comprised by the agricultural tractor. Moreover, it can also be a mobile data entry device, in particular a tablet computer or the like, which communicates with the control unit via a wireless data transfer path (for example, following the Bluetooth, WLAN, or LTE standard).

The target tractive power is calculated while taking into account a specific soil working speed of the selected implement. This is advantageous especially in the case of soil working implements, since the speed-dependent opposing resistance that arises when working the soil can be included in a precise calculation of the target tractive power. Soil-working implements can include plows, harrows, seeding machines, rotary swathers, or the like.

The specific soil working speed in general is determined from the corresponding guidelines of the implement manufacturer and can be specified by direct numeric entry via the graphical user interface or automatically by means of the selected implement. In the latter case, an identification means associated with the implement can be stipulated. The identification means can comprise an RFID identifier mounted on the implement, which contains data about the implement model among other things. The relevant data can be read wirelessly and transmitted to the control unit by means of the RFID reader, where the control unit selects the relevant specific soil working speed on the basis of the identified implement model from an implement data bank stored in a data memory. Beyond that, the identification means can also be designed for wireless data transmission in correspondence with the Bluetooth standard. In the case of an ISOBUS-based implement, the data regarding the implement model can additionally be read via an ISOBUS interface of the agricultural tractor.

Here the target tractive power can be calculated on the basis of a target tractive force required to operate the selected implement, for which the target tractive force is multiplicatively linked to the specific operating speed of the relevant implement by the control unit.

A starting value that is characteristic for the selected implement in each case is typically established for the required target tractive force. The starting value can be set either by direct numerical entry via the graphical user interface or automatically by means of the selected implement in each case. The identification means associated with the implement can be used in this case, where, on the basis of the identified implement model, the control unit selects the relevant target tractive force from the implement data bank stored in the data memory.

For redundancy in establishing the starting value, a categorization can be carried out in relationship to the maximum available tractive force of the agricultural tractor, which allows at least a rough estimate in establishing the starting value, if more detailed data regarding the selected implement or the target tractive force needed for operation are not available. The following table gives an overview of illustrative categories.

| Category | Description | Starting value of target tractive force |
| --- | --- | --- |
| 1 | None | 0% of maximum |
| 2 | Low | 30% of maximum |
| 3 | Medium | 60% of maximum |
| 4 | High | 90% of maximum |

The desired category in this case can be selected manually via the graphical user interface.

The established starting value can then be modified according to data about the soil qualities, topographical properties including a topographical course, or an optimum axle load distribution for a current operating state of the agricultural tractor. In this case the resistance opposing the implement in working the soil can be expressed more precisely with regard to the calculation of the target tractive power as to whether the soil property is loamy, soft, hard, rocky, or sandy, or if the terrain has a flat, (steeply) downward sloping or (steeply) upward sloping, or undulating topographical course, whereas the inclusion of the optimum axle load distribution for a specific operating state ensures that the agricultural tractor will display a stable handling behavior.

There is the possibility that the optimum axle load distribution for the current operating state of the agricultural tractor will be adjusted to a planned road or field operation, a drive type of the agricultural tractor, or a coupling type of an implement coupling intended for attachment of the selected implement.

Thus, the attachment or pivot point of the implement with respect to the agricultural tractor changes according to the coupling type that is used, which has the corresponding effects on the optimum axle load distribution of the agricultural tractor. Also, different requirements on the optimum axle load distribution arise in the case of road travel on a consolidated substrate or asphalt from when working a field. With regard to the drive type one further differentiates between agricultural tractors with permanent two-wheel drive (2WD), selectable all-wheel drive (MFWD), and all-wheel drive using equal-size tires (4WD). The following table gives an overview of the optimum axle load distributions seen in this respect for a two-axle agricultural tractor.

| Drive type | Coupling type | | | | | |
| --- | --- | --- | --- | --- | --- | --- |
| | Category A | | Category B | | Category C | |
| | Front | Rear | Front | Rear | Front | Rear |
| 2WD | 25% | 75% | 30% | 70% | 35% | 65% |
| MFWD | 35% | 65% | 35% | 65% | 40% | 60% |
| 4WD | 55% | 45% | 55% | 45% | 60% | 40% |

Here a coupling type of category A indicates a coupling jaw, a coupling ball (C50/C80), or a drawbar, a coupling type of category B indicates a two-point coupling, and a coupling type of category C indicates a three-point coupling in the form of a three-point hitch.

In the case of road operation, the aforementioned axle load distributions are moreover optionally modified so that 20% to 25% of the optimum axle load distribution belongs to a front axle in each case, where a value of 25% is seen as ideal.

The actual value of the axle load can be determined from a weight or center of gravity of the implement derived at the implement coupling by sensor detection of the force and lift conditions. For the case of an implement coupling made as a three-point hitch, one is referred to the method described in DE 10 2016 207 205 A1. Knowledge of the weight or center of gravity of the agricultural tractor is additionally needed then to determine the relevant actual value of the axle load. The corresponding data are fixed for the relevant tractor model and are stored in the data memory in the form of an associated tractor data set. In addition, there is the possibility of adjusting the data via the graphical user interface for purposes of taking into account additional weights that have already been mounted.

It is also possible to determine the actual value of the axle load redundantly on the basis of a type-specific predetermined weight or center of gravity of the implement while including the target tractive power that is specific to the selected implement. The actual value of the axle load is also determined here while including the weight or center of gravity of the agricultural tractor, which are fixed for the relevant tractor model, where the corresponding data are taken from the tractor data set stored in the data memory.

More precisely, first, in dependence on the fixed weight or center of gravity of the agricultural tractor, a starting value of the axle load is determined for each of the axles for the case of road operation and field operation for the attached implement. Starting from the static starting value a dynamic shift of the static starting value can be determined while including the specific target tractive power for the selected implement. The starting value obtained in this way then forms the actual value of the axle load on the relevant axle.

Apart from the procedure given above a direct determination of the actual value of the axle load by means of a load measuring bearing or the like provided on the relevant axle of the agricultural tractor can be imagined.

If a redundant determination of the actual value of the axle load takes place, there is the possibility of conducting a plausibility test, where an error report is output if the plausibility test indicates the presence of an impermissible deviation between the actual values determined for the axle load. This is the case if the deviation corresponds to a weight difference of more than 100 kg.

Moreover, the output of the ballasting proposal can, to the extent possible within the permissible maximum axle loads, be modified in terms of simultaneous maintenance of the optimum axle load distribution for the current operating state of the agricultural tractor. The axle load distribution that is optimum for the current operating state of the agricultural tractor also arises here from a planned road or field operation, the drive type of the agricultural tractor, or the coupling type of the implement coupling intended to attach the selected implement.

One possible application envisions that a tire pressure recommendation is output in dependence on the axle loads that result from the ballasting proposal. Thus, from experience the tire pressure should be increased with increasing axle load so as to ensure a constant tire contact area, especially when working a field. Here the tire pressure recommendation can additionally be adjusted in dependence on a planned road or field operation.

This can take place especially conveniently such that a tire filling system is automatically controlled in dependence on the output tire pressure recommendation.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawing, wherein.

DETAILED DESCRIPTION

Figure 1:
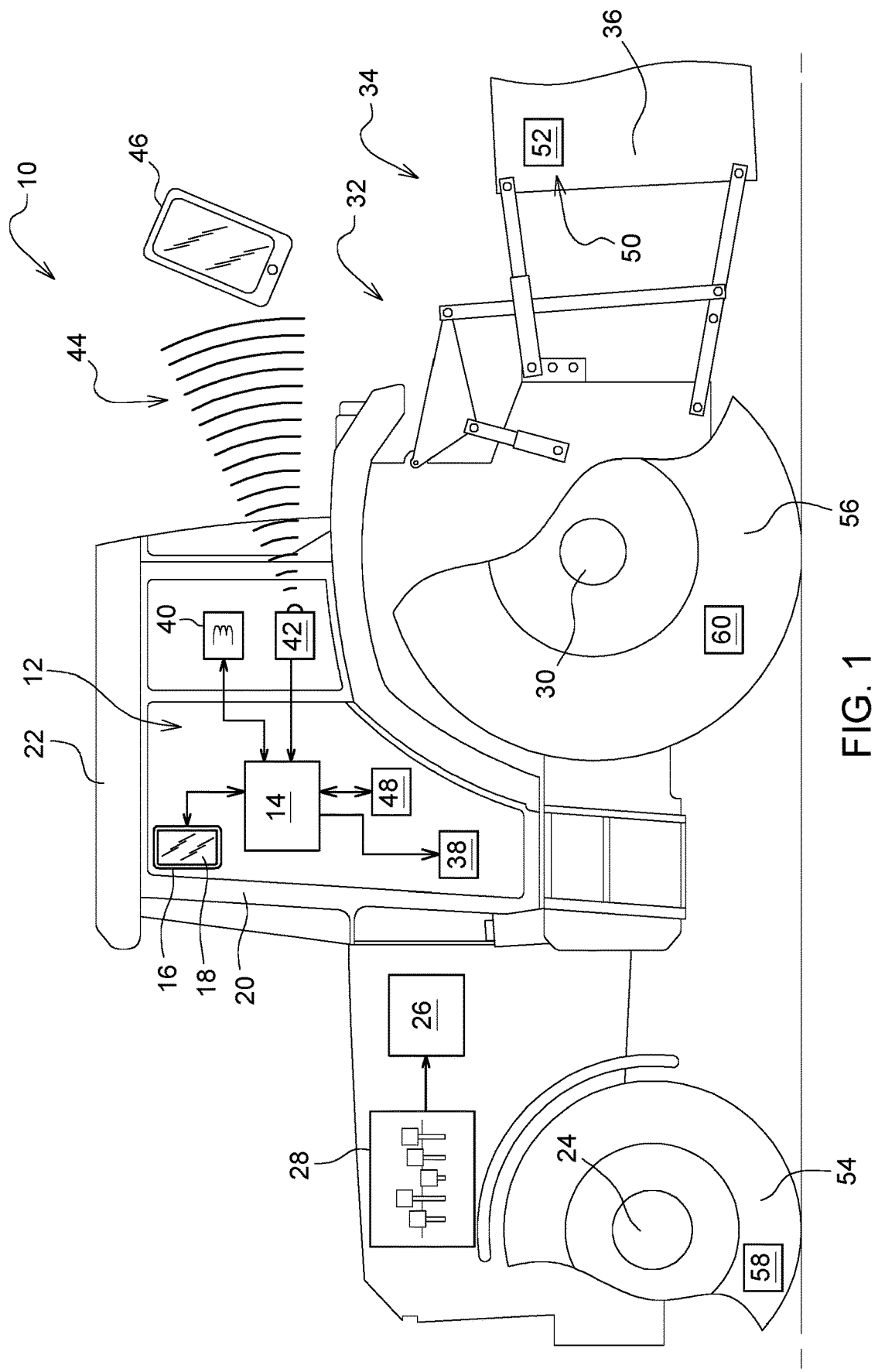
FIG. 1 shows an embodiment of a schematically represented device for conducting the method of the present disclosure.
Figure 2:
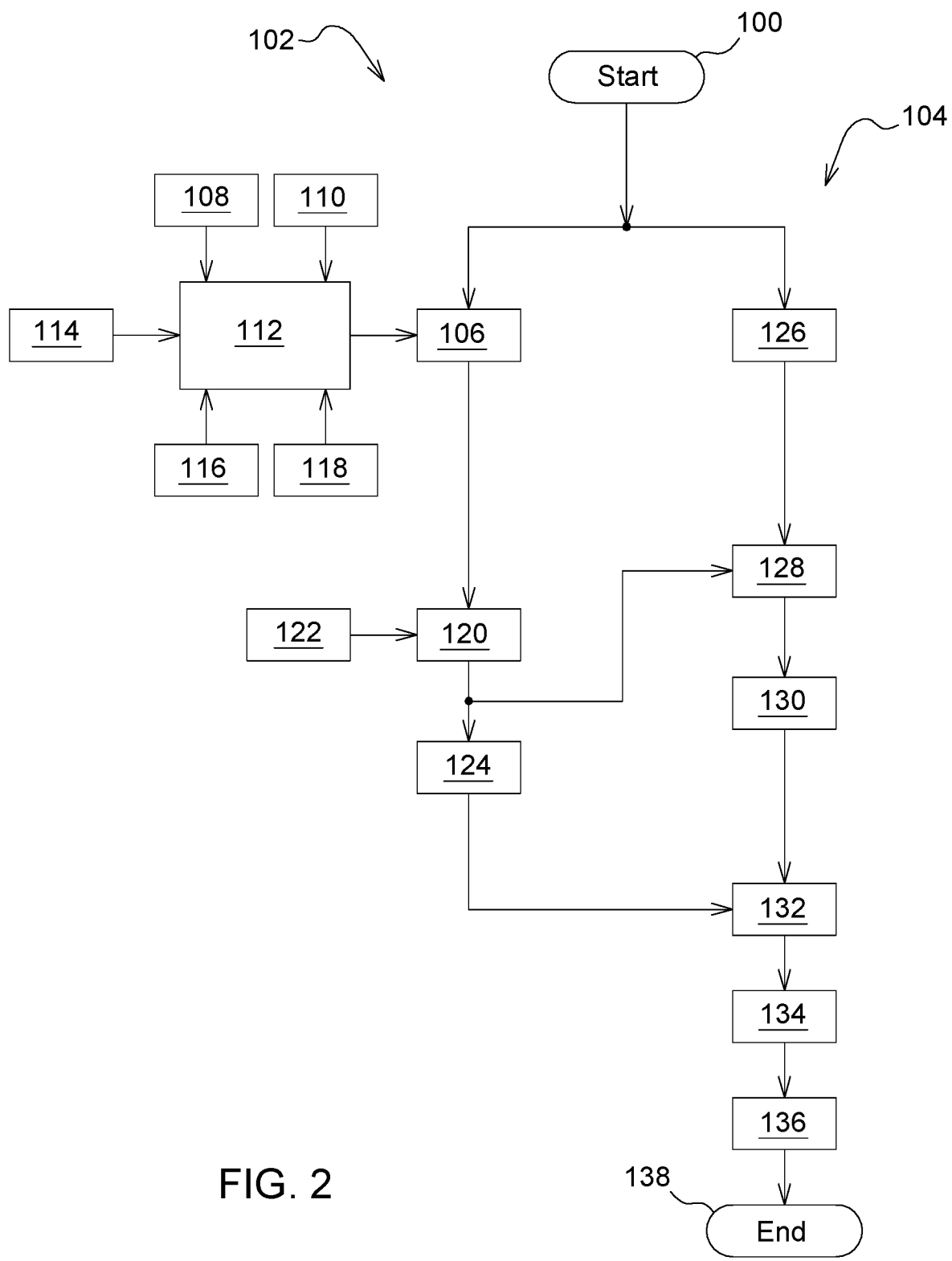
FIG. 2 shows an embodiment of the method in the form of a flow chart.

FIG. 1 shows one embodiment of a schematically represented device for conducting the method according to the present disclosure, which is illustrated in the form of a flow chart in FIG. 2.

The device 12, which is accommodated in an agricultural tractor 10, comprises a microprocessor-controlled control unit 14, which is connected to a graphical user interface 16. The graphical user interface 16 comprises a touch-sensitive user and display panel 18 and is mounted, for example, on the A column 20 inside a driver cab 22 comprised by the agricultural tractor 10.

The agricultural tractor 10 itself is conventional in design and comprises a steerable front axle 24 and a rear axle 30, which is connected to a diesel engine 28 via a vehicle transmission 26. An implement coupling 34 provided in the rear region 32 serves to attach an associated implement 36. A tire filling system 38, which can be controlled by the control unit 14, allows separate adjustment of the tire pressure by axle or wheel.

The control unit 14 communicates with an RFID reader 40 and an interface 42 to produce a wireless data exchange connection 44 to a data input device 46 in the form of a tablet computer. The wireless data exchange connection 44 here is based on the WLAN standard, but can also be Bluetooth- or LTE-based. In addition, there is a data memory 48, which is connected to the control unit 14.

The method, which is implemented by the control unit 14, will now be described in detail with reference to FIG. 2. The method may be implemented here by the control unit 14 on the basis of appropriate software. The software is stored in the data memory 48 in the form of an associated software code and is loaded into the control unit 14 or a working memory comprised by it when the agricultural tractor 10 is first put into operation.

Here the method is started in an initialization step 100, where a differentiation is to be made between a first and a second process path 102, 104. The two paths 102, 104 serve for the axle-by-axle determination of an actual value that gives a current axle load and a target value to be maintained by the axle load.

Determination of the Target Value of the Axle Load

First, the determination of the target value to be maintained by the axle load, which is carried out in the first process path 102, is now discussed. In a first primary step 106 a target tractive power that is specific for the selected implement 36 is calculated for each of the two axles 24, 30 of the agricultural tractor 10. The specific target tractive power is the drive power that is to be transmitted to the soil by the agricultural tractor 10 and which is to be applied according to the selected implement 36 for optimum conduction of an associated soil working function of the relevant axles 24, 30. The specific target tractive power is calculated on the basis of a target tractive force required to operate the selected implement 36.

A starting value that is characteristic for the relevant implement 36 is established for the required target tractive force. The starting value is set in a first side step 108 by direct numerical entry via the graphical user interface 16 or automatically by means of the selected implement 36. In the latter case, an identification means 50 associated with the relevant implement 36 as in FIG. 1 is used. The identification means 50 comprises an RFID identifier 52, which is attached to the implement 36 and which contains, among other things, data concerning the implement model. The relevant data are read wirelessly and transmitted to the control unit 14 by means of the RFID reader 40, where the control unit 14 selects, on the basis of the identified implement model, the relevant target tractive force from an implement data bank stored in the data memory 48.

For redundancy in establishing the starting value, a categorization of it in relationship to the maximum available tractive force of the agricultural tractor 10 takes place in a second side step 110, which allows at least a rough estimation and establishment of the starting value, if more detailed data regarding the selected implement 36 or the target tractive force available for operation are not available. The following table gives an overview of examples of categories.

| Category | Description | Starting value of target tractive force |
| --- | --- | --- |
| 1 | None | 0% of maximum |
| 2 | Low | 30% of maximum |
| 3 | Medium | 60% of maximum |
| 4 | High | 90% of maximum |

The desired category here can be manually selected via the graphical user interface 16.

Which of the above types is used to establish the starting value is ultimately dependent on the relevant individual case and can remain open in connection with the above illustrative description of the method.

The established starting value is then modified in a third side step 112 according to data concerning the soil quality, topographic properties including a topographic course, or an axle load distribution as optimum for a current operating state of the agricultural tractor 10, where the corresponding data are provided in a fourth, fifth, and sixth side step 114, 116, 118.

The resistance opposing the relevant implement 36 in working the soil is expressed more precisely as to the calculation of the target tractive power based on whether the soil quality is loamy, soft, hard, rocky, or sandy, or whether the terrain has a flat, (steeply) downward sloping or (steeply) upward sloping, or undulating topographic course, whereas the inclusion of optimum axle load distribution for the current operating state ensures that the agricultural tractor 10 displays a stable handling behavior.

Here, the optical axle load distribution for the current operating state of the agricultural tractor 10 is adjusted in the sixth side step 118 with regard to an intended road or field operation, a drive type of the agricultural tractor 10, or a coupling type of the implement coupling 34 provided for attaching the selected implement 36.

Thus, the attachment or pivot point of the implement 36 changes with respect to the agricultural tractor 10 in each case according to the coupling type that is used, which has corresponding effects on the optimum axle load distribution of the agricultural tractor 10. Also, different requirements arise with respect to the optimum axle load distribution in the case of road travel on a consolidated substrate or asphalt from when working a field. With regard to the drive type, one additionally distinguishes between agricultural tractors with permanent two-wheel drive (2WD), selectable all-wheel drive (MFWD), and all-wheel drive using equal-size tires (4WD). The following table gives an overview of the optimum axle load distributions envisioned in this respect for the two axles 24, 30 of the agricultural tractor 10.

| Drive type | Coupling type | | | | | |
|---|---|---|---|---|---|---|
| | Category A | | Category B | | Category C | |
| | Front | Rear | Front | Rear | Front | Rear |
| 2WD | 25% | 75% | 30% | 70% | 35% | 65% |
| MFWD | 35% | 65% | 35% | 65% | 40% | 60% |
| 4WD | 55% | 45% | 55% | 45% | 60% | 40% |

In this case a coupling type of category A indicates a coupling jaw, a coupling ball (C50/C80), or a drawbar, a coupling type of category B indicates a two-point coupling, and a coupling type of category C indicates a three-point coupling in the form of a three-point hitch.

In the case of road operation, the above axle load distributions are additionally optionally modified so that the front axle 24 has 25% of the optimum axle load distribution.

The target tractive force determined in this way in the first primary step 106 is used in a second primary step 120 to calculate the specific target tractive power. Here the specific target tractive power is calculated by the control unit 14 while taking into account a specific soil working speed of the selected implement 36, for which the determined target tractive force for each axle is multiplicatively linked to the specific soil working speed of the relevant implement 36.

The data concerning the specific soil working speed of the relevant implement 36 are provided in a seventh side step 122. The specific soil working speed arises from the corresponding instructions of the implement manufacturer and is set either by direct numerical entry via the graphical user interface 16 or automatically by means of the implement 36 that is selected in each case. In the latter case, the identification means 50 that is associated with the implement 36 is also used here, where the control unit 14 selects the relevant specific soil working speed for the identified implement model from the implement data bank stored in the data memory 48.

In a third primary step 124, a contact force required to transmit the appropriate drive power is calculated from the specific target tractive power for each of the two axles 24, 30 of the agricultural tractor 10 based on the tractive capacity of the associated tires 54, 56, which is assumed to be known, and the target value to be maintained for the axle load at the relevant axle 24, 30 is derived directly from the contact force.

Regarding the tractive capacity of the tires 54, 56, which is assumed to be known, a fixed characteristic value for the relevant tire model is specified. Alternatively, the actual tractive power is derived by the control unit in dependence on a current tire pressure and the tire model that is used and is the basis for the calculation of the target value of the axle load. Here the tire pressure or the tire model is made available in accordance with FIG. 1 by an RFID sensor 58, 60 embedded in a tire, in the form of the corresponding filling pressure or identifier data, where the data can be read wirelessly and transmitted to the control unit 14 by the RFID reader 40. In addition to a provision by sensor, there is also the possibility of a manual entry of the tire pressure or the tire model via the graphical user interface 16 that is connected to the control unit 14.

Determination of the Actual Value of the Axle Load

Synchronously with the first process path 102, the actual value expressing the current axle load is determined in the second process path 104.

This takes place in a fourth primary step 126 on the basis of a weight or center of gravity of the implement 36 derived at the implement coupling 34 by sensor detection of the force and pivot conditions. For the special case of an implement coupling 34 designed as a three-point hitch 34, one is referred to the method described in DE 10 2016 207 205 A1. Then, knowledge of the weight or center of gravity of the agricultural tractor 10 is still required to determine the relevant true value of the axle load. The corresponding data are fixed for the relevant tractor model and are stored in the form of an associated tractor data set in the data memory 48. In addition, there is the possibility of adjusting the data for purposes of taking into account already mounted additional weights via the graphical user interface 16.

Further, in a fifth primary step 128, the actual value of the axle load is redundantly determined for each of the two axles 24, 30, on the basis of a type-specific, also fixed weight or center of gravity of the implement 36, taking into account the target tractive power that is specific for the selected implement 36. The data concerning the weight or center of gravity of the implement 36 are taken from the implement data bank stored in the data memory 48, whereas the result of the calculation conducted in the second primary step 120 is employed in connection with the determination of the specific target tractive power. The determination of the actual value of the axle load also takes place here with additional inclusion of the weight or center of gravity of the agricultural tractor 10, where the corresponding data are fixed and are taken from the tractor data set stored in the data memory 48.

More precisely, in the fifth primary step 128, in dependence on the fixed weight and center of gravity of the agricultural tractor 10, a starting value of the axle load is determined for each of the two axles 24, 30 for the case of road operation and also field operation with the attached implement 36. Based on this static starting value, a dynamic shift of the static starting value is determined while taking into account the target tractive power that is specific for the selected implement 36. The starting value obtained in this way then forms the actual value of the axle load on the relevant axles 24, 30.

In a sixth primary step 130, a plausibility test is carried out for the actual values determined independently in the fourth and fifth primary steps 126, 128 for the axle load, where an error report is output by the control unit 14 via the graphical user interface 16 if the plausibility test indicates the presence of an impermissible deviation between the actual values determined for the axle load. This is the case if the deviation corresponds to a weight difference of more than 100 kg.

The plausibility test serves in this case to verify the actual value determined in the fourth primary step 126 for the axle load, where in the case of a positive test result, it is compared in a seventh primary step 132 with the target value of the axle load determined for the axle load in the third primary step 124, which takes place separately for each of the two axles 24, 30. Starting from the comparison result, a ballasting for each axle required to maintain the relevant target value is computed in an eighth primary step 134 and is output in the form of a relevant ballasting proposal via the graphical user interface 16, for which it is appropriately controlled by the control unit 14. The output of the ballasting proposal is, provided this is possible within the permissible maximum axle loads, modified in terms of the simultaneous maintenance of the optimum axle load distribution for the current operating state of the agricultural tractor 10 according to the sixth side step 118.

The ballasting proposal obtained by comparison with the actual value of the axle load can easily be implemented by the user by adding or removing the corresponding additional weights (for example, wheel weights, front or rear weights), where already mounted additional weights are taken into account in the ballasting proposal, since they are included in the actual value determined for the axle load.

In a ninth primary step 136, moreover, a tire pressure recommendation in dependence on the axle loads resulting from the ballasting proposal is output. Moreover, the tire filling system 38 is automatically controlled by the control unit 14 in dependence on the output tire pressure recommendation.

Then, the method is ended in a final step 138.

While embodiments incorporating the principles of the present disclosure have been described hereinabove, the present disclosure is not limited to the described embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A method for making available a ballasting proposal for an agricultural tractor using a control unit, comprising:
providing an implement for the agricultural tractor;
identifying by the control unit the implement via an identifier and a reader;
selecting by the control unit a target tractive force required to operate the identified implement;
calculating by the control unit a target tractive power on the basis of the target tractive force for the implement for each axle of the agricultural tractor;
deriving by the control unit a target value for an axle load to be maintained on each axle based upon a function of the calculated target tractive power;
determining by the control unit an actual axle load on each axle;
comparing by the control unit the target value to the actual axle load;
calculating by the control unit an axle ballasting value based on a result of the comparing step required to maintain the target valve; and
outputting by the control unit the ballasting value to a graphical user interface.

2. The method of claim 1, wherein the calculating by the control unit a target tractive power step comprises calculating by the control unit the target tractive power step as a function of a working speed of the implement.

3. The method of claim 1, further comprising determining by the control unit a starting value for the implement for the required target tractive force.

4. The method of claim 3, wherein for a subsequent determining by the control unit of the starting value, executing by the control unit a categorization based on a maximally available tractive force of the agricultural tractor.

5. The method of claim 3, further comprising modifying by the control unit the starting value based on data related to soil quality, topographic properties, or an optimal axle load distribution for a current operating state of the agricultural tractor.

6. The method of claim 5, further comprising modifying by the control unit the starting value based on data related to soil quality, topographic properties, or an optimal axle load distribution for a current operating state of the agricultural tractor.

7. The method of claim 5, further comprising adjusting by the control unit the optimal axle load distribution for the current operating state of the agricultural tractor with respect to an intended road or field operation, a drive type of the agricultural tractor, or a type of an implement coupling provided for attaching the implement to the agricultural tractor.

8. The method of claim 7, further comprising subsequently or continuously determining by the control unit the actual value of the axle load as a function of a type-specific weight or center of gravity of the implement and the target tractive power for the implement.

9. The method of claim 1, further comprising:
detecting by the control unit a force and pivot condition by a sensor at an implement coupling; and
determining by the control unit the actual value of the axle load as a function of a weight or center of gravity of the implement derived at the implement coupling based on the detecting step.

10. The method of claim 1, further comprising:
determining by the control unit a redundant actual axle load on each of the plurality of axles;
executing by the control unit a plausibility test for the actual axle load and the redundant axle load;
generating by the control unit an error report if the plausibility test indicates a presence of an impermissible deviation between the actual axle load and the redundant axle load.

11. The method of claim 1, further comprising modifying by the control unit the output of the ballasting proposal based on a simultaneous maintenance of an axle load distribution that is optimum for the current operating state of the agricultural tractor.

12. The method of claim 1, further comprising outputting by the control unit a tire pressure recommendation in dependence on the axle loads that result and the ballasting proposal.

13. The method of claim 12, further comprising controlling automatically by the control unit a tire filling station based on the tire pressure recommendation.

14. A device for making available a ballasting proposal for an agricultural tractor, comprising:
a control unit for controlling the agricultural tractor;
a plurality of axles of the agricultural tractor; and
an implement coupled to the agricultural tractor, the implement configured to perform a function;
wherein, the control unit is configured to identify the implement via an identifier and a reader, select a target tractive force required to operate the implement, calculate a target tractive power based upon the target tractive force specific for each of the plurality of axles that is specific for the implement, derive a target value for an axle load to be maintained on each axle based upon a function of the calculated target tractive power, determine an actual axle load on each of the plurality of axles, compare the target value to the actual axle load for each of the axles, calculate an axle-by-axle ballasting required to maintain the target value, and output the required ballasting in the form of an associated ballasting proposal via a graphical user interface.

15. The device of claim 14, wherein the control unit determines a redundant actual axle load on each of the plurality of axles, executes a plausibility test for the actual axle load and the redundant axle load, and generates an error report if the plausibility test indicates a presence of an impermissible deviation between the actual axle load and the redundant axle load.

16. The device of claim 14, further comprising a sensor in communication with the control unit, the sensor configured to detect a force and pivot condition at a coupling location of the implement and communicating the force and pivot condition to the control unit, the control unit configured to determine the actual value of the axle load as a function of a weight or center of gravity of the implement derived at the implement coupling based on the detected force and pivot condition.

17. The device of claim 14, further comprising at least one tire having a tire pressure, wherein the control unit is configured to output a tire pressure recommendation of the at least one tire in dependence on the axle loads and the ballasting to the graphical user interface.

18. A method for making available a ballasting proposal for an agricultural tractor using a control unit, comprising:
providing an implement for the agricultural tractor;
identifying by the control unit the implement via an identifier and a reader;
selecting by the control unit a target tractive force required to operate the implement;
calculating by the control unit a target tractive power on the basis of the target tractive force for the implement for each axle of the agricultural tractor;
deriving by the control unit a target value for an axle load to be maintained on each axle based upon a function of the calculated target tractive power;
determining by the control unit the weight of the implement by a sensor at an implement coupling;
determining by the control unit an actual axle load on each axle based upon the weight of the agricultural tractor and the weight of the implement;
determining by the control unit a redundant actual axle load on each axle based upon the weight of the agricultural tractor, the weight of the implement, and the target tractive power;
executing by the control unit a plausibility test for the first and second actual axle loads;
generating by the control unit an error report if the plausibility test indicates an impermissible deviation between the actual axle load and the redundant axle load;
comparing by the control unit the target value to the first actual axle load;
calculating by the control unit an axle ballasting value based on a result of the comparing step required to maintain the target valve; and
outputting by the control unit the ballasting value to a graphical user interface.

* * * * *